Oct. 30, 1945.    H. V. PUTMAN    2,387,943
MAGNETIC CORE STRUCTURE
Filed March 25, 1943
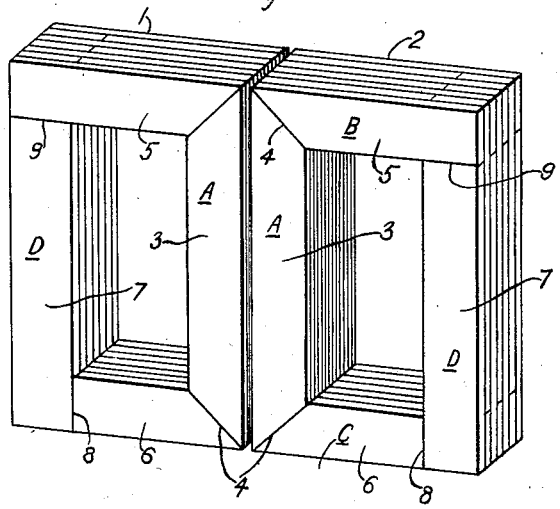
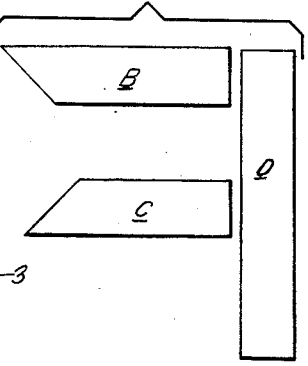
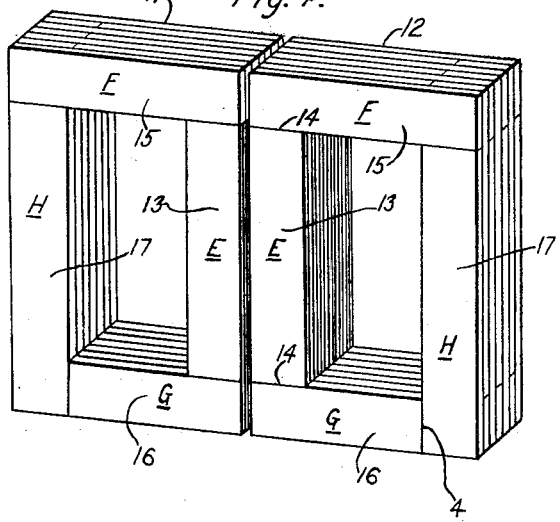
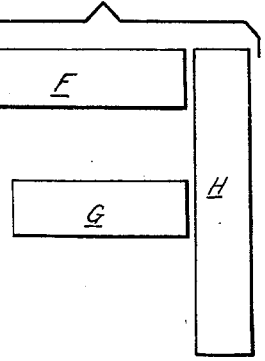
WITNESSES:
INVENTOR
Henry V. Putman.
BY
Franklin E. Hardy
ATTORNEY Patented Oct. 30, 1945

2,387,943

UNITED STATES PATENT OFFICE 2,387,943

MAGNETIC CORE STRUCTURE

Henry V. Putman, Sharon, Pa., assignor to Westinghouse Electric Corporation, East Pittsburgh, Pa., a corporation of Pennsylvania Application March 25, 1943, Serial No. 480,462

11 Claims. (Cl. 175—356)

My invention relates to electrical induction apparatus such as transformers, and particularly to the core or magnetic circuit structure thereof, and to the method of making the same.

Some commercial grades of steel with preferred grain orientation have better magnetic properties in the direction of rolling than in a direction at right angles to the direction of rolling. That is, when the lines of magnetic flux pass through the steel substantially in the direction of rolling, the core loss is less and the permeability of the steel is higher than when the lines of magnetic flux pass at an angle to the direction of rolling. To properly take advantage of the properties of this improved steel, it is necessary that the steel be so used that the direction of magnetization of the steel coincides substantially with the grain, or direction of rolling, of the steel so that the lines of magnetic flux shall not pass through the steel at an appreciable angle from the direction of rolling.

In a copending application of J. K. Hodnette Serial No. 401,698, filed July 10, 1941, for Induction apparatus, and assigned to the same assignee as this application, a core structure is disclosed that is formed of successive layers of magnetic sheet material wound flatwise layer upon layer and bonded together by filling the successive layers or turns of magnetic material with bonding or filling material, thereby providing a solid or nonyielding laminated structure having a firm under-layer bond for all portions of the layers of sheet steel which is beneficial in producing a true and relatively unburred cut surface forming the face of the butt joints.

In Patent No. 2,293,951, issued to J. E. Seastone and C. C. Horstman, August 25, 1942, for Induction apparatus and method of core construction therefor, and assigned to the same assignee as this application, a further development in the formation in the low-loss butt joints is disclosed in which chemically inert bonding material is applied to the laminations. The core is cut, worked and etched to remove parts which could electrically connect adjacent laminations. In practicing the present invention, the certain of the teachings of the earlier filed Hodnette application and of the Seastone and Horstman patent may be employed to increase the efficiency in the use of the steel.

In electrical induction apparatus such as distribution or power transformers, it has been the usual practice to employ a core structure of magnetic material formed of a stack of layers of thin sheets or laminations of magnetic material such, for example, as hot-rolled silicon steel. A portion of the magnetic structure is employed as a winding leg about which the transformer windings are wound. In order to keep the cost of transformer as low as possible, it is desirable that the length of the mean turn of the current carrying conductor about the winding leg be as small as practicable consistent with permissible losses and proper performance of the transformer. It is therefore customary to employ a higher density of magnetic flux in the winding leg than in other parts of the core structure thus requiring a smaller cross-section of material in the winding leg than in the remaining parts of the core. There are limitations in the amount of decrease in the cross-section of the winding leg and the permissible increase in flux density therein due to the characteristics of the steel.

The smaller the cross-section of the winding leg of a given transformer core the greater will be the flux density in that portion of the core and the greater will be the exciting current flowing in the primary winding. The permissible exciting current for a given size of transformer has been a factor in limiting the permissible reduction in the cross-section of the winding leg.

The exciting current is made up of two components or parts, namely, the magnetizing current that is necessary to force the lines of magnetic flux through the iron circuit of the core and the iron loss current necessary to supply losses of energy in the iron core structure such as those losses due to hysteresis and eddy currents. The component of magnetizing current is controlled very largely by the permeability of the material used in the core structure and the watts loss current is controlled by the iron loss characteristic of the material.

The magnetic iron or steel usually employed in transformer core structures is a high grade hot-rolled silicon steel having random orientation of the crystal grains and having a value of permeability and watts loss per cubic volume of substantially constant value regardless of the axis of the sheet along which the lines of magnetic flux pass or a considerable departure from the direction of rolling. More expensive steels such as Hipersil have been developed by cold rolling the material during the process of manufacture and annealing in hydrogen for effecting a preferred orientation of the axis of easiest magnetization of the crystal grains of the material in the direction of rolling. In such material the permeability varies as the direction of the lines of magnetizing flux vary from the direction of rolling of the material and is highest in the direction of rolling the watts loss per cubic volume or cubic weight of the material is lowest in the direction of rolling.

The permeability of cold rolled steel having a preferred orientation of the grains in the direction of rolling is considerably higher at operating densities (say, 13 to 20 kilogausses) than the permeability of commercial grades of hot-rolled silicon steels at the same densities. Likewise, the watts loss per unit volume of unit weight at operating densities when magnetized in the direction of rolling are lower than the values of these quantities of commercial grades of hot-rolled silicon steel at the same density.

It will be seen, therefore, that if the winding leg of a transformer core is formed of cold rolled sheet steel having a preferred orientation of the grains in the direction of rolling and in which the direction of cutting the sheets employed in the winding leg corresponds to the direction of rolling the material, that is, in the direction in which the lines of magnetic flux pass through that portion of the core, a higher permeability and lower watts loss will result, permitting the use of higher flux densities than are permissible with the usual grade of hot-rolled silicon steel. By using the higher cost better grade of magnetic material having preferred orientation of the grains in the winding leg portion of the core and using less expensive material in other portions of the core where a larger cross-section may readily be employed, thus decreasing the flux density in these portions of the core, a satisfactory core structure may result, taking advantage both of the higher efficiency of the better material in the winding leg and of the lower cost of a less efficient material in the remaining portions of the material.

It is an object of my invention to provide an electrical induction apparatus having a core structure in which a higher cost, higher grade steel is employed in the winding leg so positioned that the lines of magnetization correspond substantially to the direction of rolling of the material, and in which a lower cost, less efficient steel is employed in the remaining portions of the core structure.

It is a further object of the invention to provide a magnetic core structure in which the winding leg portions of the core are formed of bundles of relatively thin laminations having high grade magnetic characteristics which are solidly bonded together providing block-like core unit parts, and in which the remaining portions of the core structure are formed of individually stacked relatively thicker laminations of material having lower grade magnetic characteristics.

Other objects and advantages of the invention will appear from the following description of a preferred embodiment of the invention, reference being had to the accompanying drawing, in which:

Figure 1 is a perspective view of two core loops forming a core structure in accordance with my invention;

Fig. 2 is a perspective view of the leg member of one of the two loops;

Fig. 3 is a side view of three different shaped laminations, a number of which are stacked to form the other three sides of each core loop;

Fig. 4 is a perspective view of two core loops forming another embodiment of the invention;

Fig. 5 is a perspective view of the winding leg members of the two core loops shown in Fig. 4;

Fig. 6 is a side view of three shapes of laminations, a number of which are used to form the remaining three sides of the rectangular core loops shown in Fig. 4.

The sheets or laminations comprising the leg members of the core loops are coated with a bonding material such as a toluol alcohol solution of alvar vinylite and Bakelite. In practice, it has been found satisfactory to utilize a resinous product such as a condensation product of the phenol aldehyde type. To meet different conditions, the phenol aldehyde type resin may be modified by means well known in the art. After the bonding material has been applied to the sheets of steel, it is permitted to dry and after drying the punchings are stacked in a jig and heated while pressure is applied to the stack. The assembly is then cooled under pressure resulting in the punchings or laminations being solidly bonded together. When a chemically inert material is applied in this manner, it strongly adheres to bond the laminations between which it is disposed whereby the bundle of laminations is solidly held together in a rigid piece or core structure unit, the laminations of the unit being united by the bonded material applied to them. In order to provide accurately smooth faces on the winding leg members, the ends of the leg members are either machined or ground, or otherwise mechanically worked to present an accurately smooth surface. It has been found that during the machining or grinding operations to provide the smooth surface burrs are formed. These burrs are tiny slivers of magnetizable material which may span the bonding layers between adjacent layers of magnetizable material at the mechanically worked surface thereby electrically connecting or short-circuiting the adjacent laminations. This increases both the iron losses and the magnetizing current of the electrical apparatus if not removed.

It is therefore desirable to remove these burrs in order to provide a commercially acceptable device. The burrs may be removed by applying an etching solution to the faces in any suitable manner. Many different kinds of etching solutions may be employed successfully. It has been found in practice that a 30% nitric acid solution is highly satisfactory. The etching solution may be applied in any suitable manner such as by dipping the face of the worked surface to be etched in the nitric acid solution for about 30 seconds. When the faces are withdrawn from the nitric acid solution, it is desirable to apply sodium carbonate to neutralize the acid. When the acid remaining on the stack has been neutralized, water is applied to remove the particles resulting from the neutralizing process. The above described lightly etched treatment of the working faces removes the burrs without substantially roughening the smooth plane surface resulting from the machining or grinding operation.

Referring to Fig. 1 of the drawing, two core loops 1 and 2 are shown which are identical in construction and are each provided with a winding leg member 3 formed of a stack of laminations of a high grade steel such as that having preferred orientation of the grain crystals above referred to in which it is desirable that the flux at all times passes through the laminations in the direction of rolling, which is in the direction of the length of the individual laminations. Such high grade steel is commonly rolled into thinner sheets than the common hot-rolled silicon steel used to form the other parts of the core loop. The laminations forming the winding leg 3 are coated with a bonding material and heated while under pressure as above described forming a solid brick A of closely adhering laminations as shown in Fig. 2. The end surfaces 4 of the winding leg are then ground or machined in the manner above described to form smooth surfaces. The angle of these surfaces is such that the flux passing through the winding leg of the core will travel the entire length of the winding leg in the direction of the rolling of the material and not crosswise thereof, even adjacent the ends of the winding leg of the portions of the core, thus entering the upper and lower yoke portions of the cores 5 and 6 without being required to flow crosswise of the leg members. The remaining three members 5, 6 and 7 of each core loop 1 and 2 are formed by layers of stacked laminations which are unbonded and are placed layer upon layer in a manner similar to the usual way of forming a stacked core having lapped joints at the corners. In the present structure, however, there exists a butt joint at the end surfaces 4 of the winding legs. Each of the upper and lower yoke members 5 and 6 are made up of alternate layers of punchings or laminations corresponding in shape to those shown as B and C in Fig. 3, and the outer leg member 7 is formed of punchings having the shape shown as member D in Fig. 3. The members B and C differ in length by the width of the member D, so that the member C as shown in the first layer of Fig. 6 extends from the surface 4 of the winding leg to the inner edge of the member D as shown at 8, and the sheet B extends from the surface 4 to the outer edge of the core structure passing over the end of the lamination D as shown at 9. The alternate layers of laminations in both members 5 and 6 correspond to the laminations B and C, respectively, and the members D alternate their position so that in one layer the lamination D extends from the bottom of the core structure upwardly to the underside of the lamination B, and in the next adjacent layer it extends downwardly from the upper edge of the core to the upper edge of the lamination B in the lower member 6. The two winding leg members 3 of the two core loops 1 and 2 together form the winding leg portion of the completed core.

In Figs. 4, 5 and 6, a similar structure is shown having two core loop members 11 and 12, respectively, including winding leg members 13 corresponding to the brick E shown in Fig. 5 and made up by bonding a stack of thin laminations of high grade material in the same manner as is the brick unit A in Fig. 2. The winding leg member E differs from the member A in Fig. 2 in that the end portions of the leg 13 are cut at right angles to the axis of the winding leg member instead of at an angle thereto as in Figs. 1 and 2. The general principle of assembly is the same, the upper and lower yoke members 15 and 16, respectively, being formed of laminations shown as F and G in Fig. 6 alternating in layer after layer in the two yoke members. All of these laminations F and G extend across the end surfaces 14 of the leg members E toward the outer leg member 17 which is made up of laminations having the form identified by the letter H in Fig. 6. The laminations H in the outer leg members alternate in position the same as do the laminations D in Fig. 1, extending in one layer from the bottom of the core structure up to the lower edge of the upper yoke member, and in an adjacent layer from the top of the core structure down to the upper edge of the lower yoke member.

The core structure has been particularly described with respect to the use of high grade oriented steel in the winding legs, and the conventional hot-rolled silicon steel in the outer legs and in the yoke members. It will be appreciated that the principle of the invention may be implied wherever two different grades of steel are applied, a high grade steel being used in the winding leg having a relatively small cross-sectional area and operating at high flux density, and the remaining portions of the core loop being formed of a lower grade magnetic material where higher cross-sectional areas are permissible in order that these members may operate at a lower flux density. The winding leg material may have a thickness of the lamination of, say, .011 inch, and the other laminations shown in Figs. 3 and 6 may have a thickness of, say, .014 inch. The particular thickness is not of prime importance, but it is common practice to form higher grade material into thinner laminations and where the winding leg portion of the core is made into a solid brick structure as here described, the difficulty of matching laminations of different thicknesses at their adjoining edges when lap joints are employed is overcome.

Since modifications may be made in the structures illustrated and described within the spirit of my invention I do not wish to be limited otherwise than by the scope of the appended claims.

I claim as my invention:

1. In a magnetic core structure for electrical induction apparatus, in combination, a core loop forming a magnetic circuit surrounding a rectangular window and including a winding leg member along one side of the window formed of a plurality of sheets of magnetic material having preferred greater permeability and lower watts loss in the direction of rolling than in other directions and so positioned in the structure that the direction of magnetization corresponds to the direction of rolling, the winding leg member of the core being formed as a solidly held bundle of superimposed layers of sheet material with intervening bonding layers of an adherent insulating bond between the sheets, each bonding layer adhering to both of the sheets between which it is disposed whereby the bundle of sheets are solidly held together as a unitary structure, the material surrounding the other three sides of the window and connecting the ends of the winding leg being formed of stacked sheets of steel having lower permeability and higher watts loss per unit volume in the direction of magnetization than the material in the winding leg.

2. In a magnetic core structure for electrical induction apparatus, in combination, a core loop forming a magnetic circuit surrounding a rectangular window and including a winding leg member along one side of the window formed of a plurality of sheets of magnetic material having preferred greater permeability and lower watts loss in the direction of rolling than in other directions and so positioned in the structure that the direction of magnetization corresponds to the direction of rolling, the winding leg member of the core being formed as a solidly held bundle of superimposed layers of sheet material with intervening bonding layers of an adherent insulating bond between the sheets, each bonding layer adhering to both of the sheets between which it is disposed whereby the bundle of sheets are solidly held together as a unitary structure, and having faces worked on opposite ends of the unit to provide elements for making butt joints, the material surrounding the other three sides of the window and connecting the ends of the winding leg being formed of stacked sheets of steel having lower permeability and higher watts loss per unit volume in the direction of magnetization than the material in the winding leg, the stacked sheets of steel used in the three legs of the rectangular core structure being thicker than the sheets in the winding leg portion of the core.

3. In a magnetic core structure for electrical induction apparatus, in combination, a core loop forming a magnetic circuit surrounding a rectangular window and including a winding leg member along one side of the window formed of a plurality of sheets of magnetic material having preferred greater permeability and lower watts loss in the direction of rolling than in other directions and so positioned in the structure that the direction of magnetization corresponds to the direction of rolling, the winding leg member of the core being formed as a solidly held bundle of superimposed layers of sheet material with intervening bonding layers of an adherent insulating bond between the sheets, each bonding layer adhering to both of the sheets between which it is disposed whereby the bundle of sheets are solidly held together as a unitary structure, and having faces worked on opposite ends of the units to provide smooth surfaces extending in planes from the outer corner of the core to the corner of the core window to provide elements for making butt joints, the material surrounding the other three sides of the window and connecting the ends of the winding leg being formed of stacked sheets of steel having lower permeability and higher watts loss per unit volume in the direction of magnetization than the material in the winding leg, the stacked sheets of steel used in the three legs of the rectangular core structure being thicker than the sheets in the winding leg portion of the core.

4. In a magnetic core structure for electrical induction apparatus, in combination, a core loop forming a magnetic circuit surrounding a rectangular window and including a winding leg member along one side of the window formed of a plurality of sheets of magnetic material having preferred greater permeability and lower watts loss in the direction of rolling than in other directions and so positioned in the structure that the direction of magnetization corresponds to the direction of rolling, the winding leg member of the core being formed as a solidly held bundle of superimposed layers of sheet material with intervening bonding layers of an adherent insulating bond between the sheets, each bonding layer adhering to both of the sheets between which it is disposed whereby the bundle of sheets are solidly held together as a unitary structure, and having faces worked on opposite ends of the units to provide smooth surfaces providing elements for making butt joints adapted to engage the inner edges of sheets forming the members of the core connecting the ends of the winding leg member, the inner edges of which sheets extend along continuous straight lines from the corners of the window, the sheets forming the members connecting the ends of the leg member and completing the magnetic circuit about the other three sides of the window being of stacked sheets of steel having lower permeability and higher watts loss per unit volume in the direction of magnetization than the material in the winding leg, the stacked sheets of steel being thicker than the sheets in the winding leg portion of the core.

5. Electric induction apparatus including a magnetic core forming a closed magnetic circuit surrounding a window and including a winding leg portion adapted to be surrounded by a winding, the winding leg portion of the core being formed of material having higher permeability and lower magnetic losses per unit volume than the material in the other parts of the core, the winding leg member of the core being formed as a solidly held bundle of superimposed layers of sheet material with intervening bonding layers of an adherent insulating bond between the sheets, each bonding layer adhering to both of the sheets between which it is disposed whereby the bundle of sheets are solidly held together as a unitary structure, the remaining portions of the core being formed of unbonded stacked sheets of steel.

6. Electric induction apparatus including a magnetic core forming a closed magnetic circuit surrounding a window and including a winding leg portion adapted to be surrounded by a winding, the winding leg portion of the core being formed of material having higher permeability and lower magnetic losses per unit volume than the material in the other parts of the core, the winding leg member of the core being formed as a solidly held bundle of superimposed layers of sheet material with intervening bonding layers of an adherent insulating bond between the sheets, each bonding layer adhering to both of the sheets between which it is disposed whereby the bundle of sheets are solidly held together as a unitary structure, the remaining portions of the core being formed of unbonded stacked sheets of steel, the stacked sheets of steel being thicker than the sheets in the winding leg portion of the core.

7. Electric induction apparatus including a magnetic core forming a closed magnetic circuit surrounding a window and including a winding leg portion adapted to be surrounded by a winding, the winding leg portion of the core being formed of material having higher permeability and lower magnetic losses per unit volume than the material in the other parts of the core, the winding leg member of the core being formed as a solidly held bundle of superimposed layers of sheet material with intervening bonding layers of an adherent insulating bond between the sheets, each bonding layer adhering to both of the sheets between which it is disposed whereby the bundle of sheets are solidly held together as a unitary structure, and having faces worked on opposite ends of the unit to provide elements for making butt joints, the remaining portions of the core being formed of unbonded stacked sheets of steel, the stacked sheets of steel being thicker than the sheets in the winding leg portion of the core.

8. In a magnetic core structure for electrical induction apparatus, in combination, a core loop forming a magnetic circuit surrounding a rectangular window and including a winding leg member along one side of the window formed of a plurality of sheets of magnetic material having preferred greater permeability and lower watts loss in the direction of rolling than in other directions and so positioned in the structure that the direction of magnetization corresponds to the direction of rolling, the winding leg member of the core being formed as a solidly held bundle of superimposed layers of sheet material with intervening bonding layers of an adherent insulating bond between the sheets, each bonding layer adhering to both of the sheets between which it is disposed whereby the bundle of sheets are solidly held together as a unitary structure, the material surrounding the other three sides of the window and connecting the ends of the winding leg being formed of stacked sheets of steel having lower permeability and higher watts loss per unit volume in the direction of magnetization than the material in the winding leg.

9. In a magnetic core structure for electrical induction apparatus, in combination, a core loop forming a magnetic circuit surrounding a rectangular window and including a winding leg member along one side of the window formed of a plurality of sheets of magnetic material having preferred greater permeability and lower watts loss in the direction of rolling than in other directions and so positioned in the structure that the direction of magnetization corresponds to the direction of rolling, the winding leg member of the core being formed as a solidly held bundle of superimposed layers of sheet material with intervening bonding layers of an adherent insulating bond between the sheets, each bonding layer adhering to both of the sheets between which it is disposed whereby the bundle of sheets are solidly held together as a unitary structure, the material surrounding the other three sides of the window and connecting the ends of the winding leg being formed of stacked sheets of steel having lower permeability and higher watts loss per unit volume in the direction of magnetization than the material in the winding leg, the stacked sheets of steel used in the three legs of the rectangular core structure being thicker than the sheets in the winding leg portion of the core.

10. In a magnetic core structure for electrical induction apparatus, in combination, a core loop forming a magnetic circuit surrounding a rectangular window and including a winding leg member along one side of the window formed of a plurality of sheets of magnetic material having preferred greater permeability and lower watts loss in the direction of rolling than in other directions and so positioned in the structure that the direction of magnetization corresponds to the direction of rolling, the winding leg member of the core being formed as a solidly held bundle of superimposed layers of sheet material with intervening bonding layers of an adherent insulating bond between the sheets, each bonding layer adhering to both of the sheets between which it is disposed whereby the bundle of sheets are solidly held together as a unitary structure, and having faces worked on opposite ends of the units to provide smooth surfaces extending in planes from the outer corner of the core to the corner of the core window to provide elements for making butt joints, the material surrounding the other three sides of the window and connecting the ends of the winding leg being formed of stacked sheets of steel having lower permeability and higher watts loss per unit volume in the direction of magnetization than the material in the winding leg.

11. In a magnetic core structure for electrical induction apparatus, in combination, a core loop forming a magnetic circuit surrounding a rectangular window and including a winding leg member along one side of the window formed of a plurality of sheets of magnetic material having preferred greater permeability and lower watts loss in the direction of rolling than in other directions and so positioned in the structure that the direction of magnetization corresponds to the direction of rolling, the winding leg member of the core being formed as a solidly held bundle of superimposed layers of sheet material with intervening bonding layers of an adherent insulating bond between the sheets, each bonding layer adhering to both of the sheets between which it is disposed whereby the bundle of sheets are solidly held together as a unitary structure, and having faces worked on opposite ends of the units to provide smooth surfaces providing elements for making butt joints adapted to engage the inner edges of sheets forming the members of the core connecting the ends of the winding leg member, the sheets forming the members connecting the ends of the leg member and completing the magnetic circuit about the other three sides of the window being of stacked sheets of steel having lower permeability and higher watts loss per unit volume in the direction of magnetization than the material in the winding leg.

HENRY V. PUTMAN.